S. VANSTONE.
File Cutting Machine.
No. 35,130.
Patented April 29, 1862.
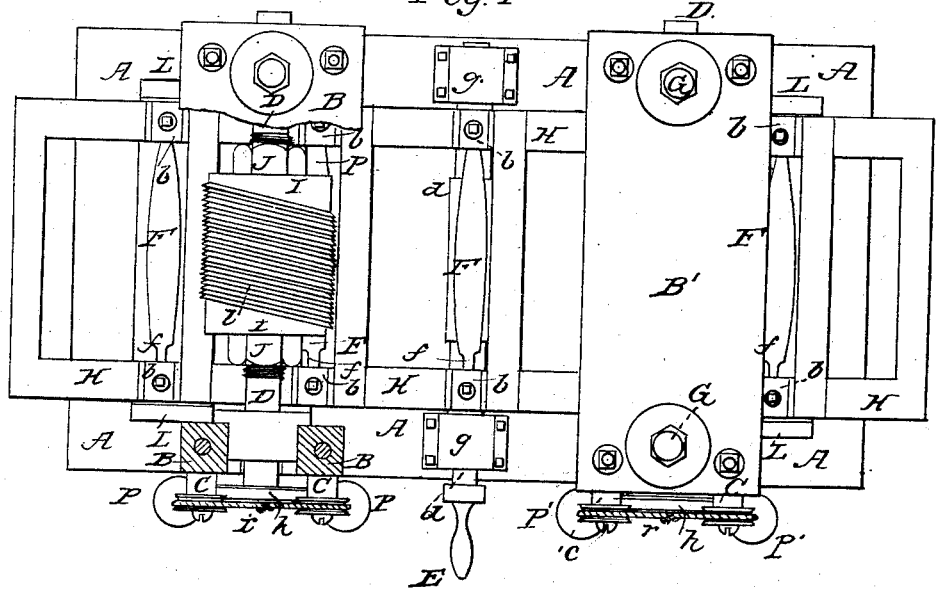
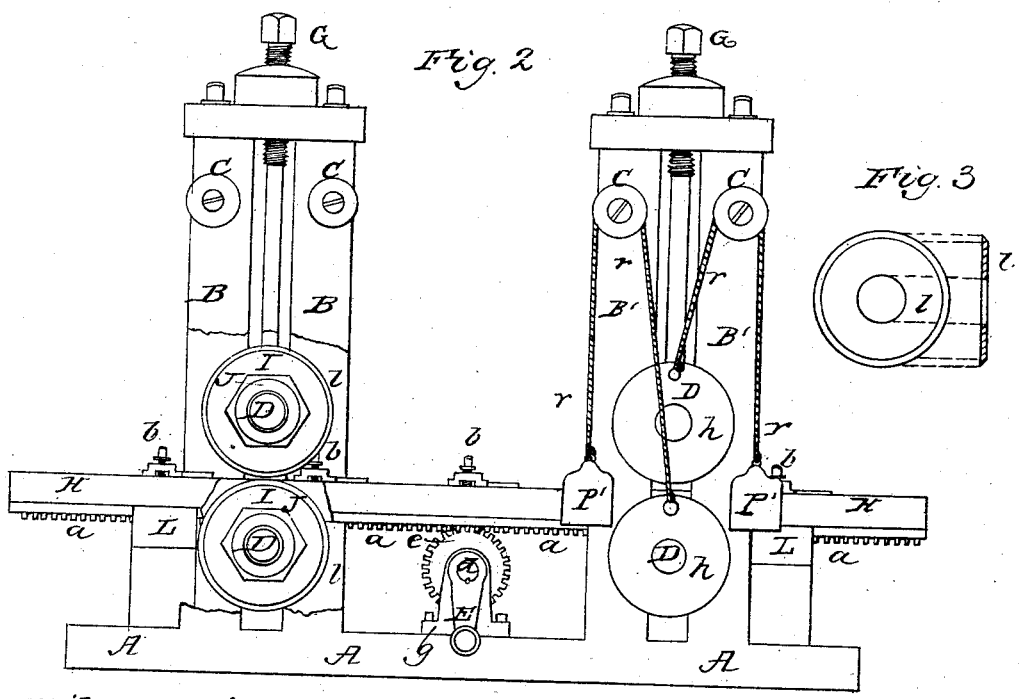
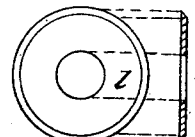

UNITED STATES PATENT OFFICE.

SAMUEL VANSTONE, OF PROVIDENCE, RHODE ISLAND, ASSIGNOR TO HIMSELF, AND WM. P. PIERCE, OF BOSTON, MASSACHUSETTS.

IMPROVEMENT IN MACHINES FOR CUTTING FILES.

Specification forming part of Letters Patent No. 35,130, dated April 29, 1862.

*To all whom it may concern:*

Be it known that I, SAMUEL VANSTONE, of Providence, in the county of Providence and State of Rhode Island, have invented certain new and useful Improvements in Machines for Cutting Files; and I do hereby declare that the following is a full, clear, and exact description of the same, reference being had to the accompanying drawings, making part of this specification, in which—

Figure 1 is a plan of a machine embracing my improvements. Fig. 2 is a side elevation of the same, with a portion of the frame B removed to give an unobstructed view of the working parts. Fig. 3 is a plan and section of the cutting device.

Similar letters denote corresponding parts in all the figures.

My invention consists in the use of a gang or series of cutting-disks arranged to operate with a sliding carriage for holding and presenting the file-blanks to the said cutter, substantially as hereinafter set forth.

To enable others skilled in the art to make and use my invention, I will proceed to describe the construction and operation of the same.

In the said drawings, A is the bed-piece of my machine, from which ascend two or more upright frames, B B', in which are arranged suitable bearings for the shafts or mandrels D D D D, and a means for adjusting such bearings, the screws G. Upon said shafts are arranged a gang or series of cutters, $l$ $l$, &c., formed of cutting so rpunchings from a uniform thickness of steel plate, and beveling one side of the periphery sufficiently to form a cutting-edge, as seen in Fig. 3. A sufficient number of such cutters to extend and cut over the entire length of the file are arranged obliquely to their axis by being compressed between two hubs, I I, by a nut, J J, upon the outside of each, the angle of obliquity being that intended for the cutting-edges of the file. Two such gangs of cutters are arranged in each frame B B' in such a manner that by passing the file-blanks between the two laterally the two sides of the file are cut at the same time. The file-blanks F F, &c., to be thus operated upon are held in a sliding carriage, H, by means of a set-screw, $b$, which secures the shank $f$ of the file in a suitable socket formed upon one side of said carriage for the reception of the same, and said carriage is made to slide endwise in suitable guides formed on the bed-piece at L by means of the rack $a$ upon the carriage and the pinion $e$ upon the shaft $d$, the latter having a bearing in suitable stands, $g$ $g$, upon each side of the frame, and being revolved by a pulley or gear therein. (Represented in the drawings by the crank E.)

The two gangs of cutters in their respective frames act in concert by contact with the two opposite surfaces of the file-blank as it passes between the same with the sliding movement of the carriage, the said cutters being made to partially revolve or oscillate in their bearings in passing over the width of the file-blank, after which the said cutters are returned to their former position by means of weights P P', attached by cords $r$ to pulleys or face-plates $h$ upon the shafts D D, &c., of the cutters, and suspended from sheaves $c$ $c$, &c., upon the frame, over which said cords pass, as shown in Fig. 2, or in any other suitable and effective manner.

The depth of the cuts is regulated by means of the screws G G upon each side of the frames B, and the gang of cutters is adapted to the shape of the file by varying the diameter of the several cutters, according to the relative swelling or depression of the surface upon which it is to cut. This may be done by grinding the level surface of the disks separately while revolving, the cutting-edge of the disks being sharpened by the same process.

The advantage arising from the employment of cutters formed and arranged as described is the facility with which said cutters can be made from sheet or plate steel, as well as repaired and sharpened, it being only necessary to substitute one (or more) fresh or sharpened disks of like size for those, which may become dull or injured from continued use or accident, and their arrangement being such that only a portion of the cutting-edge is used at a time, which when that which has been in immediate use becomes dull the gang may be revolved one-fourth of a revolution and present a new series of cutting-edges to the file-blank.

It will be seen that by means of the sliding carriage H, arranged in combination with the gangs of cutters as above described, any convenient number of file-blanks can be arranged thereon and presented successively to the cutters, and that it may be so arranged that fresh file-blanks may be inserted and those already cut removed without stopping the machine; also, that by constructing the cutters and the apparatus which governs their motions with accuracy successive cuts or cutting operations may be performed upon the same blank to cut deeper and deeper or wider and deeper, or to turn, lay, trim, or set the edge cut, as may be desired.

The machine being constructed and arranged as above described, the operation is that the file-blanks F F, &c., Fig. 1, being secured in the sliding carriage, the latter is set in motion by revolving the shaft $d$, and the said blanks passed successively between the two gangs of obliquely-arranged cutters, or through between successive gangs of cutters, cutting the blank upon each side the entire length or a part of such length.

Having described the construction and operation of my improved machine, I wish it understood that I do not claim a circular rolling cutter, as this has been previously patented by Milton D. Whipple, February 1, 1859. Neither would I be understood as claiming as my invention the peculiar method employed in the machine of Richard Bowman for making screws, as described in the *Patent Journal* for 1851, Vol. 12, page 1.

What I claim is—

The two disk-cylinders operating simultaneously upon the two sides of the blank, in combination with the peculiar construction of the disk-cylinders, substantially as described, for the purpose specified.

SAMUEL VANSTONE.

In presence of—
   ISAAC A. BROWNELL,
   THOS. J. ABBOTT, Jr.